(12) United States Patent
Zhang et al.

(10) Patent No.: US 8,542,572 B2
(45) Date of Patent: Sep. 24, 2013

(54) METHOD FOR RESOURCE UNIT ALLOCATION FOR WIRELESS COMMUNICATION, SUBSCRIBER STATION AND BASE STATION

(75) Inventors: Xiaobo Zhang, Shanghai (CN); Ni Ma, Shanghai (CN); Gang Wu, Shanghai (CN); Xun Fan, Shanghai (CN); Qi Zhou, Shanghai (CN)

(73) Assignee: ST-Ericsson SA, Plan-les-Ouates (CH)

(*) Notice: Subject to any disclaimer, the term of this patent is extended or adjusted under 35 U.S.C. 154(b) by 563 days.

(21) Appl. No.: 12/450,378

(22) PCT Filed: Mar. 18, 2008

(86) PCT No.: PCT/IB2008/051016
§ 371 (c)(1),
(2), (4) Date: Mar. 18, 2010

(87) PCT Pub. No.: WO2008/177202
PCT Pub. Date: Oct. 2, 2008

(65) Prior Publication Data
US 2010/0177741 A1    Jul. 15, 2010

(30) Foreign Application Priority Data
Mar. 23, 2007    (CN) .......................... 2007 1 0089357

(51) Int. Cl.
*H04J 11/00*    (2006.01)
*H04W 4/00*    (2009.01)

(52) U.S. Cl.
USPC .......................................... 370/208; 370/330

(58) Field of Classification Search
USPC ................. 370/202–210, 310–350
See application file for complete search history.

(56) References Cited

U.S. PATENT DOCUMENTS

| | | | | |
|---|---|---|---|---|
| 8,102,802 B2 * | 1/2012 | Ratasuk et al. | ............... | 370/329 |
| 2005/0201319 A1 * | 9/2005 | Lee et al. | ............... | 370/321 |
| 2009/0067401 A1 * | 3/2009 | Mohr | ............... | 370/342 |
| 2010/0122143 A1 * | 5/2010 | Lee et al. | ............... | 714/752 |
| 2011/0032851 A1 * | 2/2011 | Anderson | ............... | 370/280 |

FOREIGN PATENT DOCUMENTS

WO    2007023022 A1    3/2007

OTHER PUBLICATIONS

3GPP TS 25.212 V5.0.0, "3rd Generation Partnership Project; Technical Specification Group Radio Access Network; Multiplexing and channel coding (FDD), (Release 5)", Mar. 2002, 74 pages.
3GPP TR 25.826 V1.0.0, "3rd Generation Partnership Project; Technical Specification Group Radio Access Network; 3.84 Mcps TDD Enhanced Uplink; Physical Layer Aspects, (Release 7)", Feb. 2006, 22 pages.
3GPP TR 25.827 V1.0.0, "3rd Generation Partnership Project; Technical Specification Group Radio Access Network; 1.28 Mcps TDD Enhanced Uplink; Physical Layer Aspects, (Release 7)", Nov. 2006, 28 pages.
International Search Report dated Dec. 4, 2008 in connection with PCT Patent Application No. PCT/2008/051016.

(Continued)

Primary Examiner — Habte Mered
(74) Attorney, Agent, or Firm — Coats & Bennett, P.L.L.C.

(57) ABSTRACT

A method for wireless communication between a base station and a plurality of subscriber stations is described wherein a communication capacity is partitioned in resource units at least by code multiplexing, which resource units are distributed by the base station over said devices, wherein data from each subscriber station is spread by means of a signature sequence, characterized in that multiple resource units assigned to a common subscriber station have the same signature sequence.

20 Claims, 12 Drawing Sheets

(56) References Cited

OTHER PUBLICATIONS

"LCR TDD: Structure and Coding for E-AGCH and E-HICH", 3GPP TSG RAN WG1#46, Aug. 28-Sep. 1, 2006, Tallin, Estonia, 12 pages.
"LCR TDD: Structure and Coding for E-HICH", 3GPP TSG RAN WG1#47bis, Jan. 15-19, 2007, Sorrento, Italy, 13 pages.
Soyoung Park, et al., "An Enhanced Adaptive Time Slot Assignment Using Access Statistics in TD/CDMA TDD System", 2001 IEEE, p. 511-516.
3RD Generation Partnership Project. LRD TDD: "Structure and Coding for E-AGCH and E-HICH." 3GPP TSG RAN WG1#46, Tdoc R1-062331, Tallinn, Estonia, Aug. 28-Sep. 1, 2006.
3RD Generation Partnership Project. "LCR TDD: Structure and Coding for E-HICH." 3GPP TSG RAN WG1#48, Tdoc R1-070843, St. Louis, USA, Feb. 12-16, 2007.
3RD Generation Partnership Project. "Remaining aspect of LCR TDD E-HICH." 3GPP TSG RAN WG1 Meeting #49, R1-072389, Kobe, Japan, May 7-11, 2007.

* cited by examiner

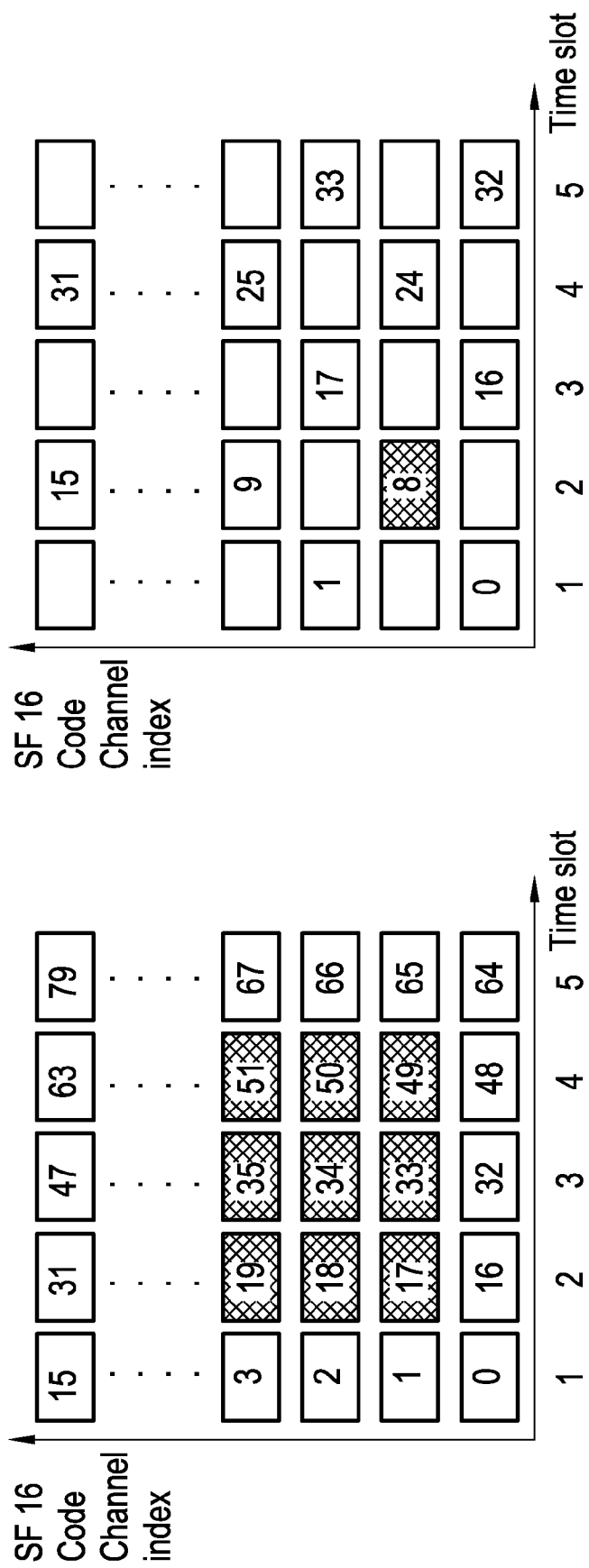

METHOD FOR RESOURCE UNIT ALLOCATION FOR WIRELESS COMMUNICATION, SUBSCRIBER STATION AND BASE STATION

CROSS-REFERENCE TO RELATED APPLICATION(S)

The present application claims priority under 35 U.S.C. §365 to International Pat. Application Ser. No. PCT/IB2008/051016 filed Mar. 18, 2008, entitled "METHOD FOR RESOURCE UNIT ALLOCATION FOR WIRELESS COMMUNICATION, SUBSCRIBER STATION AND BASE STATION". International Patent Application No. PCT/IB2008/051016 claims priority under 35 U.S.C. §365 and/or 35 U.S.C. § 119(a) to Chinese Patent Application No. 200710089357.1 filed Mar. 23, 2007 and which are incorporated herein by reference into the present disclosure as if fully set forth herein.

FIELD OF THE INVENTION

The present invention relates to a method for wireless communication.
The present invention further relates to a subscriber station.
The present invention still further relates to a base station.

BACKGROUND OF THE INVENTION

The technology of mobile telecommunication developed substantially since the first generation mobile communication system (1G). Even though 1G showed poor stability, coverage and sound quality the interest in mobile communications was evident. The capacity of 1G was limited by the analogue technology employed. A significant improvement was achieved with the digital technology introduced in 2G. With the introduction of 2G coverage, stability and security capacities increased, while at the same time more users could be served and data services became available. Examples of 2G systems are the Global System for Mobile communications (GSM) and Interim Standard 95 (IS-95) adopted in Europe and in the United States respectively. 2G systems of today are pushed to their limits using techniques like General Packet Radio Service (GPRS), offering higher data rates and thus supporting transmission of low resolution photos and limited multimedia applications.

In order to satisfy the expected needs from future applications like multimedia and video-streaming the third generation mobile communication system (3G) will replace its predecessors. The 3G system used in Europe is called Universal Mobile Telecommunications Services (UMTS). A similar system called CDMA2000 is used in the United States. The air interface used in UMTS is Wideband Code-Division Multiple Access (WCDMA). The first fully commercialized WCDMA service was operational in 2001 and since then an ongoing evolvement has taken place to increase resource utilization. WCDMA Release 5 introduced the high-speed downlink packet access (HSDP A) to improve downlink capacity, i.e. the capacity of transmission from the base transceiver station (NodeB) to the user equipment (UE). HSDPA forms part of a collection of High-Speed Packet Access (HSP A) protocols for mobile telephony that extend and improve the performance of existing UMTS protocols. Within HSP A further a high-speed uplink packet access (HSUP A) protocol is developed for an improved uplink communication, i.e. for improving the capacity of transmission from the user equipment to the NodeB.

HSUPA provides improved up-link performance of up to up to 5.76 Mbits/s theoretically. HSUPA is expected to use an uplink enhanced dedicated channel (E-DCH) on which it will employ link adaptation methods similar to those employed by HSDPA, namely a shorter Transmission Time Interval and HARQ (hybrid ARQ) with incremental redundancy.

The shorter Transmission Time Interval enables a faster matching of the modulation, coding and other signal and protocol parameters to the conditions on the radio link (e.g. the pathloss, the interference due signals coming from other transmitters, the sensitivity of the receiver, the available transmitter power margin, etc.).

HARQ (hybrid automatic repeat request) with incremental redundancy results in more effective retransmissions.

Similarly to HSDPA, HSUPA uses a packet scheduler, but it operates on a request-grant principle where the UEs request a permission to send data and the scheduler decides when and how many UEs will be allowed to do so. A request for transmission contains data about the state of the transmission buffer and the queue at the UE and its available power margin.

In addition to this scheduled mode of transmission the standards also allows a self-initiated transmission mode from the UEs, denoted non-scheduled. The non-scheduled mode can, for example, be used for VoIP services for which even the reduced TTI and the Node-B based scheduler will not be able to provide the very short delay time and constant bandwidth required.

Each MAC-d flow (i.e. QoS flow) is configured to use either scheduled or non-scheduled modes; the UE adjusts the data rate for scheduled and non-scheduled flows independently. The maximum data rate of each non-scheduled flow is configured at call setup, and typically not changed frequently. The power used by the scheduled flows is controlled dynamically by the Node-B through absolute grant (consisting of an actual value) and relative grant (consisting of a single up/down bit) messages.

The transport channel structure proposed for HSUPA comprises the following channels:

E-DPDCH, E-AGCH, E-RICH and E-DPCCH.

E-DPDCH is the Enhanced Dedicated Physical Data CHannel. This is the physical channel on radio interface (Uu) dedicated to a particular user on which payload (e.g. IP data, voice) as well as higher layer signalling (RRC and Non Access Stratum [NAS] signalling) is transmitted on the uplink by the UE (user equipment) to the Node-B.

E-AGCH: E-DCH Absolute Grant Channel (E-AGCH) is a fixed rate downlink physical channel carrying the uplink E-DCH absolute grant (power allocation). An E-DCH absolute grant shall be transmitted over one E-AGCH sub-frame or one E-AGCH frame.

The following information is transmitted by means of the absolute grant channel (E-AGCH):

Absolute Grant Value: 5 bits

Absolute Grant Scope: 1 bit

E-HICH or E-DCH HARQ Acknowledgement Indicator Channel is a downlink physical channel that carries ACK/NACK indications for TDD enhanced uplink. The ACK/NACK command is mapped to the HARQ acknowledgement indicator with 2 bits.

DPCCH, Dedicated Physical Control CHannel, is the physical channel from layer 2 on which the signaling is transmitted on the uplink by the UE to the Node-B.

The following information is transmitted by means of the E-DPCCH:

Retransmission sequence number (RSN): 2 bits
E-TFCI (Transport Format Combination Indicator): 7 bits
"Happy" bit:

Document 3GPP TS 25.212: "Multiplexing and channel coding (FDD)" proposes a TD-SCDMA system for use in the 3GPP standard. According to this proposal, the length of one radio frame is 10 ms and each frame is divided into 2 equal sub-frames of 5 ms. As shown in FIG. 1, a sub-frame constitutes of two kinds of Time Slot (TS): normal TS (TS0~TS6) and special TS (GP, DwPTS, UpPTS), where TS0 and TS1 are always designated as downlink and uplink TS respectively, DwPTS and UpPTS are the dedicated downlink and uplink pilot TSs used for downlink and uplink synchronization respectively, and GP is a guard period. The guard period GP is used to avoid interference between uplink and downlink transmissions, as well as to absorb the propagation delays between the Mobile Station and the base station when the first one sends the first signal on the UpPTS channel; at this stage in fact the propagation delay is not yet known. The switching point defines the transition from uplink to downlink. By way of example FIG. 1 shows a switching point between time slots TS3 and TS4.

According to the number of spreading codes, $TS_i$ (i=0,1, ... 6) is divided into several code channels (e.g. 4, 8, 16, etc.), which are used to transmit traffic data and some control signals.

FIG. 1 shows an example of the TD-SCDMA frame structure and physical layer configuration, in the case of 16 code channels (spreading factor=16).

The duration of the different useful time slots is expressed through a measurement unit called chip, of the duration of 0,78125 µs, equal to the reciprocal of a chiprate =1,28 Mcps corresponding to the common frequency of a set of N sequences of codes used in a useful time slot to perform the spread spectrum according to the CDMA technique.

In document 3GPP TSG RAN WG1 #46 Tdoc R1-062331: LCR TDD: Structure and Coding for E-AGCH and E-HICH, a multiplexed E-HICH structure carrying multiple ACK/NACKs towards multiple end users for TD-SCDMA is proposed on a double spreading scheme.

There are at most 5 timeslots used for uplink (from TS1 to TS5) in a TTI (sub-frame), giving a total number of 80 RUs per TTI (sub-frame). We number the resource units (RUs) in terms of timeslot and code. Timeslot 1 carries resource units 0,1, 2, ..., 15, timeslot 2 carries resource units 16,17, ..., 31, and so on, as illustrated in FIG. 3.

Channel coding process for E-HICH is proposed below as shown schematically in FIG. 17:

Each ACK/NACK indicator is firstly spread by the corresponding signature sequence (in this case a sequence of 80 bits). The signature sequence is also known and as spreading sequence or signature waveform). To be able to perform the despreading operation, the receiver must not only know the code sequence used to spread the signal, but the code of the received signal and the locally generated code must also be synchronised. The signature sequence identifies the user. Multiple signature sequences may be assigned to the same user, e.g. for a signature sequence for acknowledge messages, a signature sequence for power assignments and/or synchronization. This process is described in detail in 3GPP TSG RAN WG1#46, Tdoc R1-062331 Spare bits may be appended to the resulting sequence to add further information.

Bit scrambling is applied to each of the 88-bit sequence. In addition to spreading, part of the process on the transmitter is the scrambling operation. This is needed to separate terminals or base stations from each other. Scrambling is used on top of spreading, so it does not change the signal bandwidth but only makes the signals from different sources separable from each other. With the scrambling it would not matter if the actual spreading were done with identical code for several transmitters. The scrambling codes at the uplink separate the terminals and at the downlink separate the sectors.

Subsequent to the step of scrambling the signal may be interleaved, to minimize the consequences of burst errors. The interleaving scheme can either be block or convolutional interleaving.

Each Sequence after bit scrambling is QPSK modulated and amplitude-weighted.

Multiple acknowledgement indicators are multiplexed. (Multiplexing is transparent when only one ACK/NACK indicator is carried on the E-HICH.)

Physical channel spreading and scrambling operation are then performed in the usual manner 3GPP TSG RAN WG1#46, Tdoc R1-062331 shows that in a Pedestrian-B channel, a 1% ACK/NACK error probability is achieved at an E-HICH Ec/Ioc of −5.5 dB with default allocation scheme and −10 dB with common allocation scheme. For a typical deployment, the 5% point of the geometry CDF is assumed at an $\hat{I}_{or}/I_{oc}$ of approximately −5 dB, this indicates that: in one timeslot per frame at the stated reliability, an E-HICH acknowledgement would occupy at-most 22.3% of Node-B power with default allocation scheme. Using common midamble allocation mode this could be reduced to 7.9% per user.

Nevertheless, since multiple ACK/NACKs share one OVSF code, i.e. one midamble, further enhanced techniques, such as beamforming on E-HICH to achieve even lower power consumption are not applicable. Moreover, considering the future long term evolution (LTE) system, much more RUs are employed due to the broad band transmission. The existing "one-to-one" schemes need longer signature sequence for mapping the RUs, which will reduce the transmission efficiency.

SUMMARY OF THE INVENTION

It is a purpose of the present invention to provide a method of transmitting data that enables a lower power consumption.

The method according to the present invention allow less signature sequences to be employed. Accordingly, the signature sequences used can have a shorter size. In a preferred embodiment redundancy bits are added to the signature sequence to improve the performance.

BRIEF DESCRIPTION OF THE DRAWINGS

These and other aspects of the present invention are described in more detail with reference to the drawing. Therein:

FIG. 6 shows a second embodiment of the mapping according to the invention,

FIG. 7 shows the corresponding signature sequences index,

FIG. 8 shows a third embodiment of the mapping according to the invention,

FIG. 9 shows the corresponding signature sequences index,

DETAILED DESCRIPTION OF EMBODIMENTS

In the following detailed description of the invention, numerous specific details are set forth in order to provide a thorough understanding of the invention. However, the invention may be practiced without these specific details. In other instances well known methods, procedures, and/or components have not been described in detail so as not to unnecessarily obscure aspects of the invention.

Figure 1:
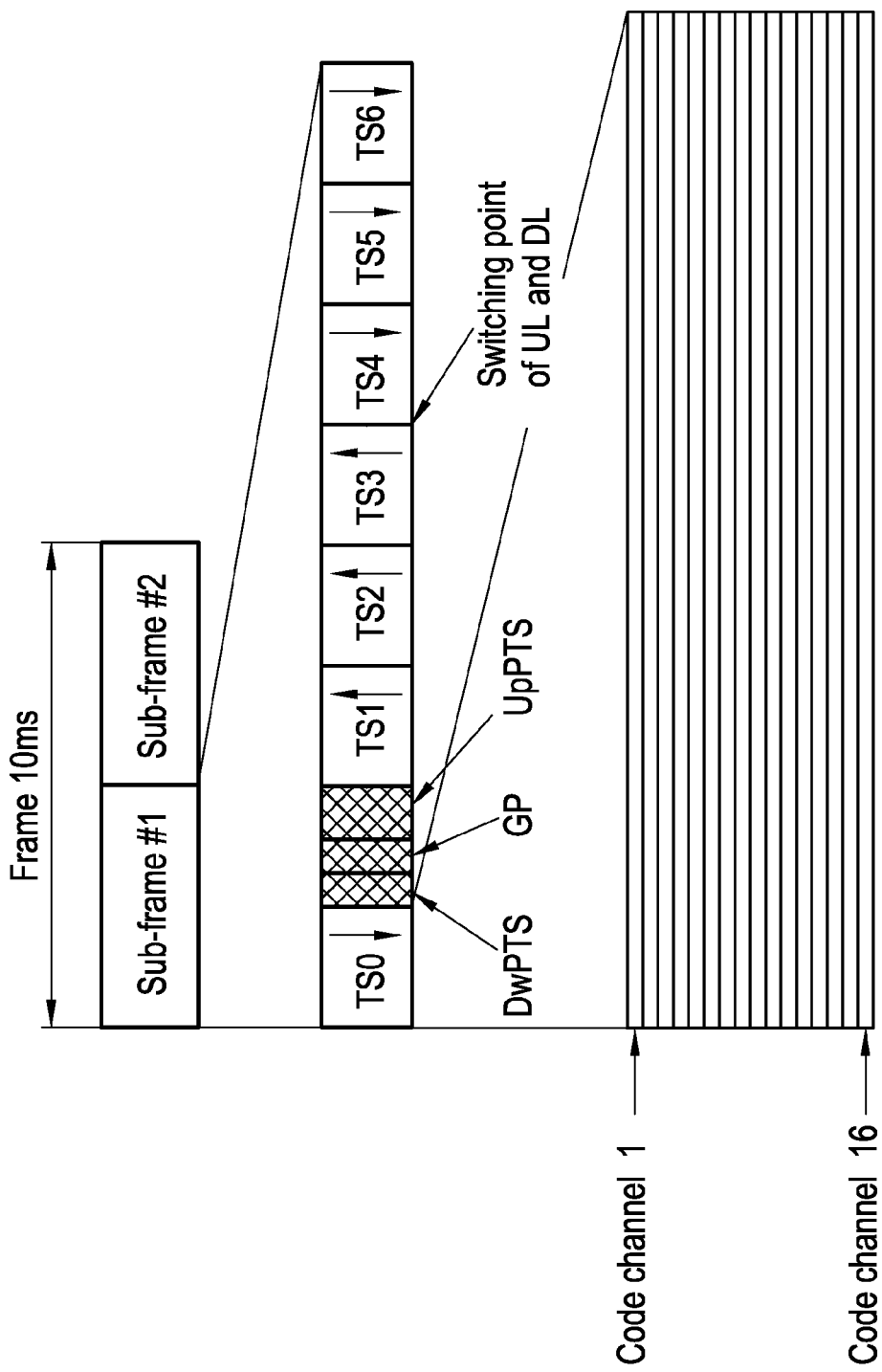
FIG. 1 shows the frame structure and physical layer configuration of TD-SCDMA.

In TD-SCDMA, the length of one radio frame is 10 ms and it is divided into 2 equal sub-frames of 5 ms. As shown in FIG. 1, a sub-frame constitutes of two kinds of Time Slot (TS): normal TS (TS0~TS6) and special TS (GP, DwPTS, UpPTS), where TS0 and TS1 are always designated as downlink and uplink TS respectively, DwPTS and UpPTS are the dedicated downlink and uplink pilot TSs used for downlink and uplink synchronization respectively, and GP is a guard period. A pilot channel is useful in order to obtain a phase reference for the coherent detection of the data modulated signal. User dedicated pilot symbols can be used as a reference for channel estimation and initialisation of the RAKE receiver fingers.

According to the number of spreading codes, $TS_i$ (i=0, 1, ... 6) is divided into several code channels (e.g. 4, 8, 16, etc.), which are used to transmit traffic data and some control signal. Taking 16 code channels (spreading factor=16) as an example, we describe the TD-SCDMA frame structure and physical layer configuration in FIG. 1.

Figure 2:
FIG. 2 shows the EUL physical channel configuration.

EUL/HSUPA has been proposed to enhance the performance of uplink transmission. A new transport channel structure is introduced for EUL-E-DCH, as shown in FIG. 2.

E-DPCCH Related Information Bits

The following information is transmitted by means of the E-DPCCH:

Retransmission sequence number (RSN): 2 bits

E-TFCI: 7 bits

"Happy" bit: 1 bit

E-AGCH

The E-DCH Absolute Grant Channel (E-AGCH) is a fixed rate downlink physical channel carrying the uplink E-DCH absolute grant (power allocation). An E-DCH absolute grant shall be transmitted over one E-AGCH sub-frame or one E-AGCH frame.

The following information is transmitted by means of the absolute grant channel (E-AGCH):

Absolute Grant Value: 5 bits

Absolute Grant Scope: 1 bit

E-HICH

ACK/NACK indications for TDD enhanced uplink are to be carried by a downlink physical channel termed the E-HICH "E-DCH HARQ Acknowledgement Indicator Channel" The ACK/NACK command is mapped to the HARQ acknowledgement indicator with 2 bits.

Scheduled and Non-Scheduled Transmission [4]

The UEs could be divided into two groups: scheduled UEs and non-scheduled UEs. For the scheduled UEs, the E-AGCH is used to transmit the TPC (Transmission Power Control)/SS (Synchronization Shift) and the E-HICH only transmit the ACK/NACK signals. While for the non-scheduled UEs, the E-HICH is used to transmit both ACK/NACK signals and TPC/SS signals since no E-AGCH was assigned.

The E-HICH physical channel uses SF16 and carries code-division-multiplexed (CDM) information for the E-HICH user set. CDM is preferred to TDM due to its inherent ability to enable per-user power control whilst keeping the average slot power constant and equal to the midamble power.

Scheduled UEs

Figure 3:
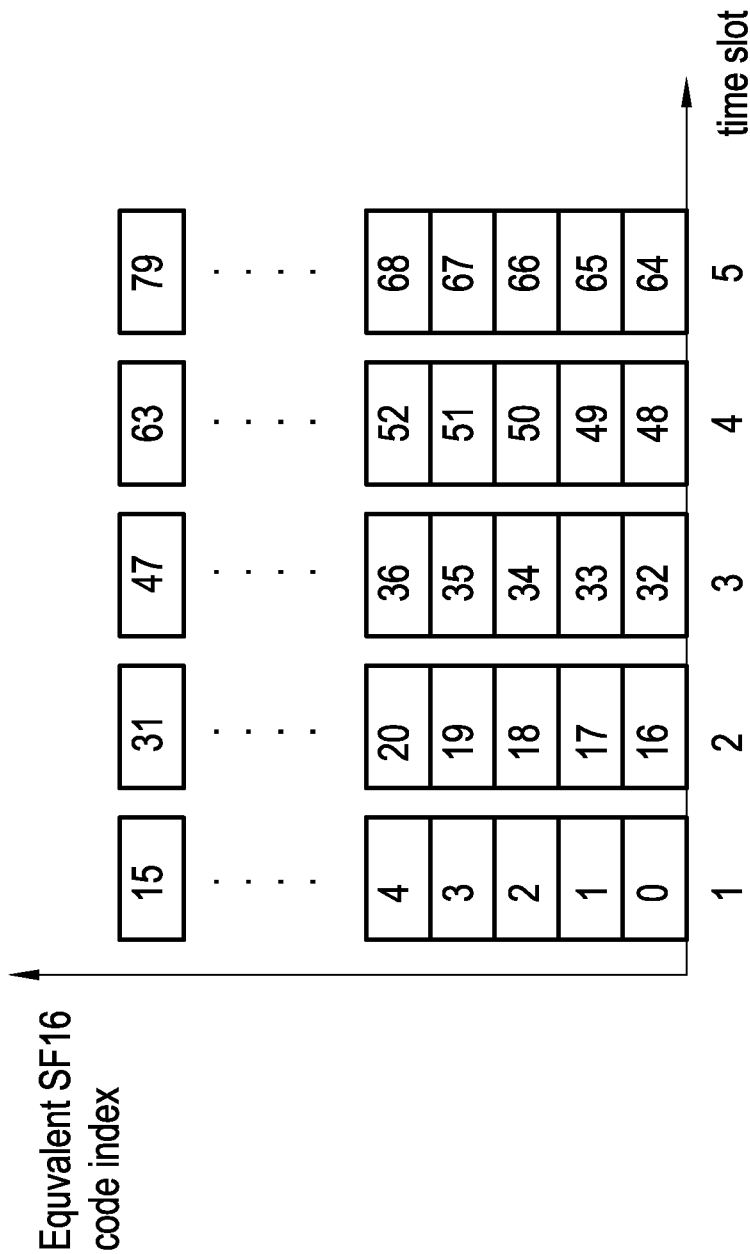
FIG. 3 shows the Resource Unit Numbering for E-HICH.

In, a multiplexed E-HICH structure carrying multiple ACKINACKs towards multiple end users for TDSCDMA was proposed on a double spreading scheme. There are at most 5 timeslots used for uplink (from TSI to TS5) in a TTI (sub-frame), giving a total number of80 RUs per TTI (sub-frame). We number the resource units (RUs) in terms of times lot and code. Timeslot 1 carries resource units 0,1, 2, ... , 15, timeslot 2 carries resource units 16,17, ... ,31, and so on, as illustrated in FIG. 3.

For every RU, one unique sequence (with 80 bits) is generated by multiply two group of orthogonal sequence. The detailed description could be found in [2].

Non-scheduled UEs

TPC and SS of scheduled users are transmitted on E-AGCH. Since there are no E-AGCHs for non-scheduled users, it is proposed that E-HICH is used to convey TPC and SS for non-scheduled users. In [5], it is proposed that the 80 signature sequences are divided into 20 groups while each group includes 4 sequences. Every non-scheduled user is assigned one group by higher layer.

Targeting two problems, embodiments of the present invention provide corresponding solutions.

In the current proposed E-HICH multiplexed E-HICH structure, one ACK/NACK includes 80 bits and totally 80 orthogonal sequences are fixedly mapped onto the RUs. One ACK/NACK towards maximally consumes 22.3% of Node B transmission power in one downlink time slot in default midamble allocation mode to hit 1% ACK/NACK error detection target 0. It also gave another manifest conclusion that the power consumption on each ACK/NACK can be lowered down, i.e. 7.9%, given that common midamble allocation mode is used 0. Nonetheless, since multiple ACK/NACKs share one OVSF code, i.e. one midamble, it stops further enhanced technique, e.g. beamforming on E-HICH to achieve even lower power consumption. Moreover, considering the future LTE system, much more RUs are employed due to the broad band transmission. The existing "one-to-one" schemes need longer signature sequence for mapping the RUs, which will reduce the transmission efficiency.

For the non-scheduled UE, the existing scheme divided the signature sequences into 20 groups, and let high layer assign one group of signature sequence to the UE 0. While the high layer assignment need additional control signals, and hence reduce the system efficiency.

For the first problem: ACK/NACK sequence occupied too much power

Taking TD-SCDMA as an example, the current scheme designs 80 unique sequences to represent ACK/NACKs for at most 80 UEs. However, it is practically impossible that 80 UEs are simultaneously in HSUPA link in one TD-SCDMA cell. Therefore, embodiments of the present invention provide two alternative schemes to reduce the ACK/NACKs sequence power. The first scheme target reducing the signature sequence number length, and the second scheme targets code-diversity scheme.

1. Multiple RUs Sharing One Signature Sequence

Even for voice transmission, two RUs are necessary for one UE. Therefore, it's quite feasible that one HSUPA UE averagely occupies more than one RU (e.g. 2 RUs, 4 RUs, etc.), which could share the same signature sequence.

2. Code-Diversity Scheme to Reduce the Necessary ACK/NACK Power

To ensure every UE has the corresponding ACK/NACK even if the UE only occupies one RU, this proposed code-diversity scheme still maps one unique signature sequence for every RU. While for the UE occupying more than one RU, multiple corresponding Signature sequence could be used for this UE and essentially utilizing the code diversity feature to improve the reception performance.

For the second problem: non-scheduled UEs needs high layer assignment

For the non-scheduled UE, four signature sequences are necessary for one UE to transmit ACK/NACK and TPC/SS. Therefore, embodiments of the present invention provide alternative mapping scheme for non-scheduled UE, that is, define 20 RUs and every RUs is mapped with 4 signature sequences. The 20 RUs are distributed in the 80 RUs at various formats.

Additionally, considering the unfixed position of switch point of TD-SCDMA, when not all 5 TSs are assigned as UL slots, it's wasteful for reserve Signature sequence for the DL RUs. Embodiments of the present invention provide a dynamical mapping scheme to make the system utilize the signature sequences more effectively.

For the first problem: ACK/NACK sequence occupied too much power

1. "One-to-Multiple" Signature Sequence

According to the current specification [3], the allocated resources to one HSUPA UEs should be continuous in one TS, and occupy the same code channels in a continuous manner TSs. Therefore, it is feasible to map one Signature sequence onto several adjacent RUs with appropriate distance.

Figures 4, 5:
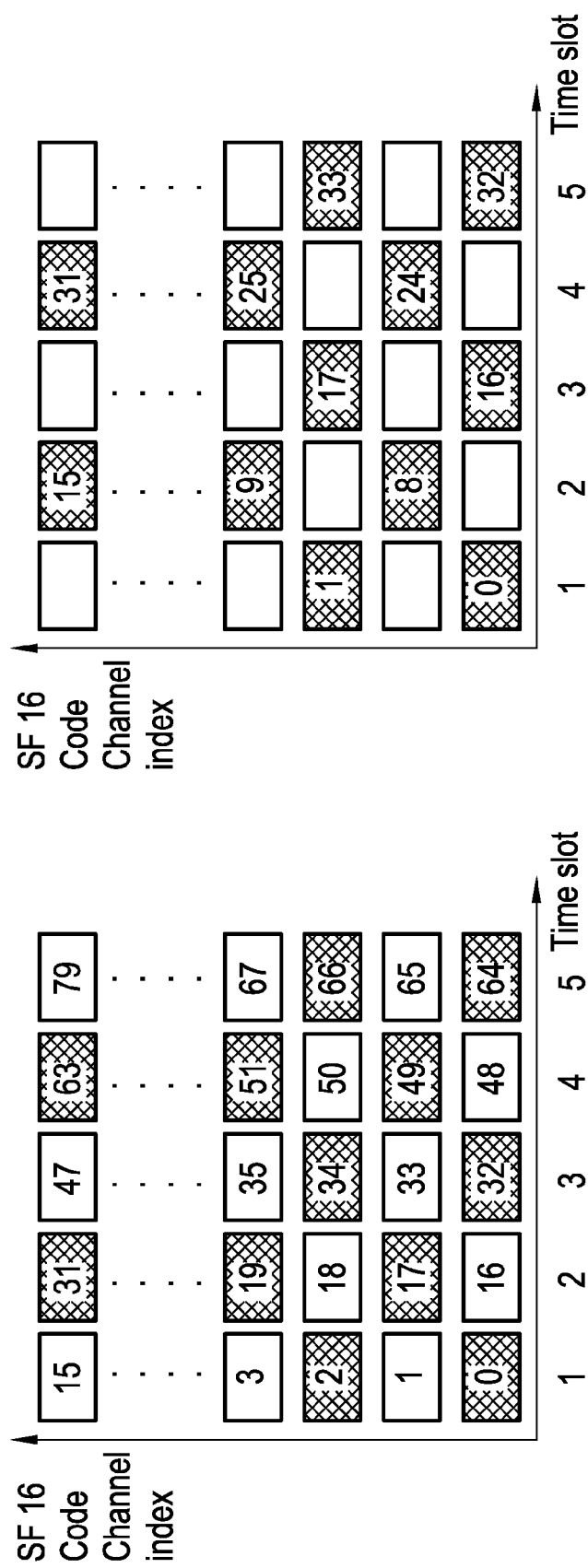
FIG. 4 shows a first embodiment of the mapping according to the invention.
FIG. 5 shows the corresponding signature sequences index.

For example, if every two RUs in one TS share one sequence, and the same code channel in adjacent TSs share the same sequence (FIG. 4, the grey colour RU corresponds to the mapping position of Signature sequence), totally 40 Signature sequences are enough for mapping all the 80 RUs (FIG. 5).

Additionally, interlacedlly mapping Signature sequences in adjacent TSs is better considering the UE occupying one code channel while across several continuous TSs.

In FIG. 6, the UEs that occupies a group of RUs will employ the unique Signature sequence corresponding to the gray color RU with the least TS number and code channel index. For example, FIG. 6 is the allocated RUs for one UE, and the corresponding employed Signature sequence is index 8, as shown in FIG. 7.

It should be noted that the format of mapping ACK/NACK onto RUs could vary according to practical scenario. Two adjacent Signature sequences could be spaced out by larger distance, e.g. 2 RUs, so as to further reduce the employed ACK/NACK number.

It is possible (although not frequently) that the RUs allocated to one UE doesn't cover one Signature sequence. Also taking FIG. 3 as an example, if the NodeB allocate the code channel 0 of TS2 to one UE, then this UE can't find corresponding Signature sequence. In order to solve this problem, the NodeB have to insure that the allocated RUs to any UE cover at least one ACK/NACK, which is easier for NodeB since usually one HSUPA UE will occupy quite a few RUs.

Employing the combined scheme, the system could map less (e.g. 15) Signature sequences onto RUs, and restore several Signature sequences (e.g. 5) for supplementation. Therefore, totally much less (e.g. 20) Signature sequences are deployed by the system, which greatly reduces the sequence length.

2. Code-Diversity Scheme to Reduce the Necessary ACK/NACK Power

Above proposed schemes try to reduce the necessary transmitting power via reduce the Signature sequence number. However, a weak point of these schemes is that the BS allocation is necessary when the UE only occupy the RUs without corresponding Signature sequence, which will reduce the system efficiency due to the additional control signals.

Therefore, another candidate scheme is given in this section without changing the "one-to-one" mapping relationship between RU and Signature sequence. The key point of this scheme is for the UE occupying more than one RUs, multiple Signature sequences could be used for this UE to transmit ACK/NACK bit. Since the Signature sequences are vectors of orthogonal matrix and can be regarded as spread code sequence, one UE's ACK/NACK bit occupy multiple Signature sequences could reach the code-diversity effect so as to improve the reception performance.

Theoretically speaking, the more Signature sequences allocated to one UE, the better reception performance could be achieved. However, when a UE occupies quite a lot RUs, e.g. 16 or more, it's unnecessary to allocate one UE so many Signature sequences considering the de-spread complexity. Therefore, the predefined number N could be set for the maximum Signature sequences number allocated to one UE, and the schemes could be described below:

Assuming the UE occupies m RUs:

If $m \leq N$, the UE uses all the m corresponding Signature sequences to transmit the ACK/NACK bit.

If $m>N$, the UE uses the m Signature sequences corresponding to the occupied RUs with lowest m serial-numbers.

Figures 8, 9:
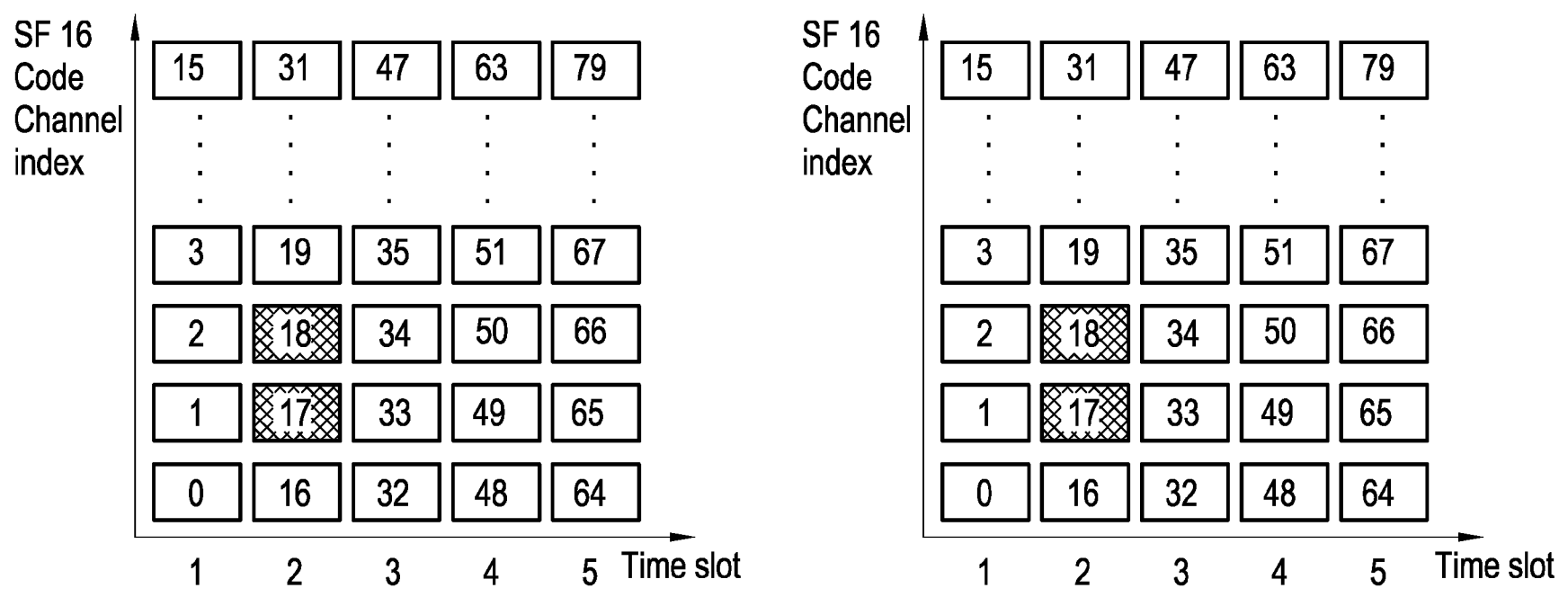
Figures 10, 11:
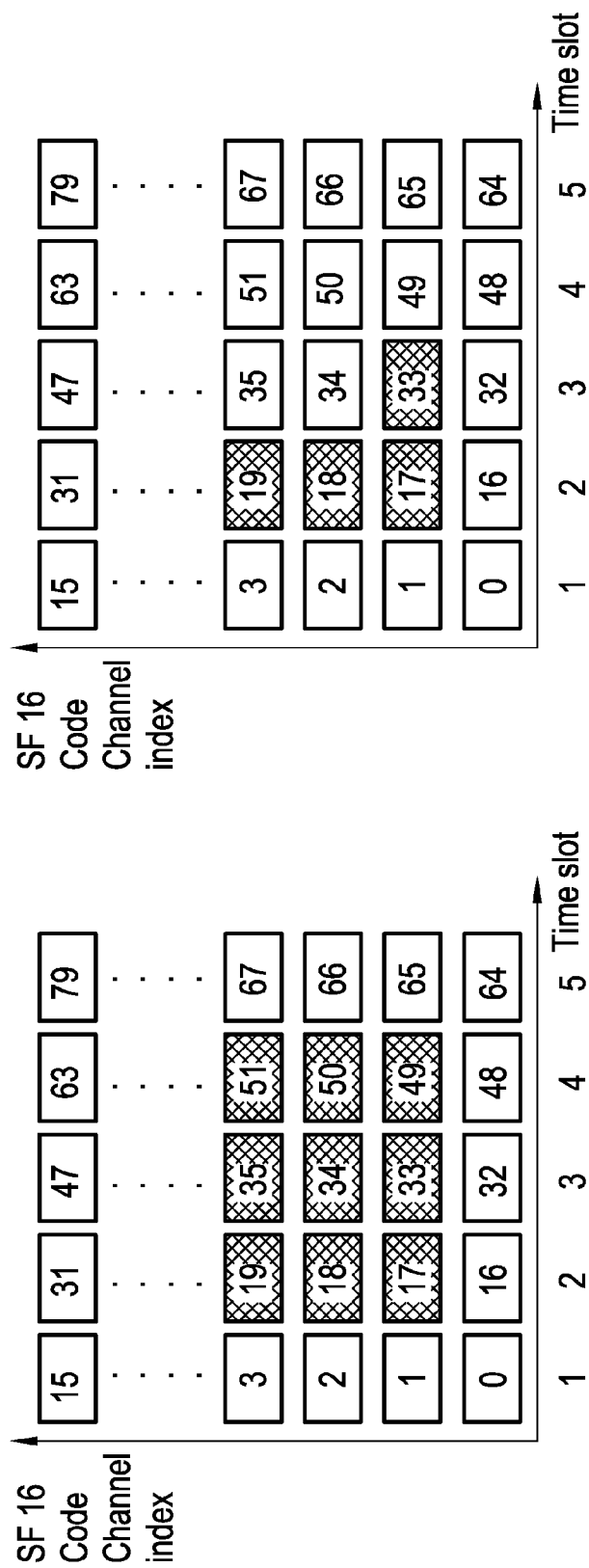
FIG. 10 shows a fourth embodiment of the mapping according to the invention.
FIG. 11 shows the corresponding signature sequences index.

For example, if N=4, for one UE occupies two RUs, two Signature sequences will be allocated, as shown in FIG. 8 and FIG. 9; for one UE occupies six RUs, four Signature sequences (corresponding to the lowest four serial-numbers) will be allocated, as shown in FIG. 10 and FIG. 11.

For the second problem: non-scheduled UEs needs high layer assignment a. Mapping Schemes for Non-Scheduled UEs The existing scheme divide the 80 signature sequences into 20 groups with 4 sequences in one group. For every non-scheduled UE, higher layer will assign corresponding group of signature sequences. However, the high layer assignment reduce the system efficiency.

Figure 12:
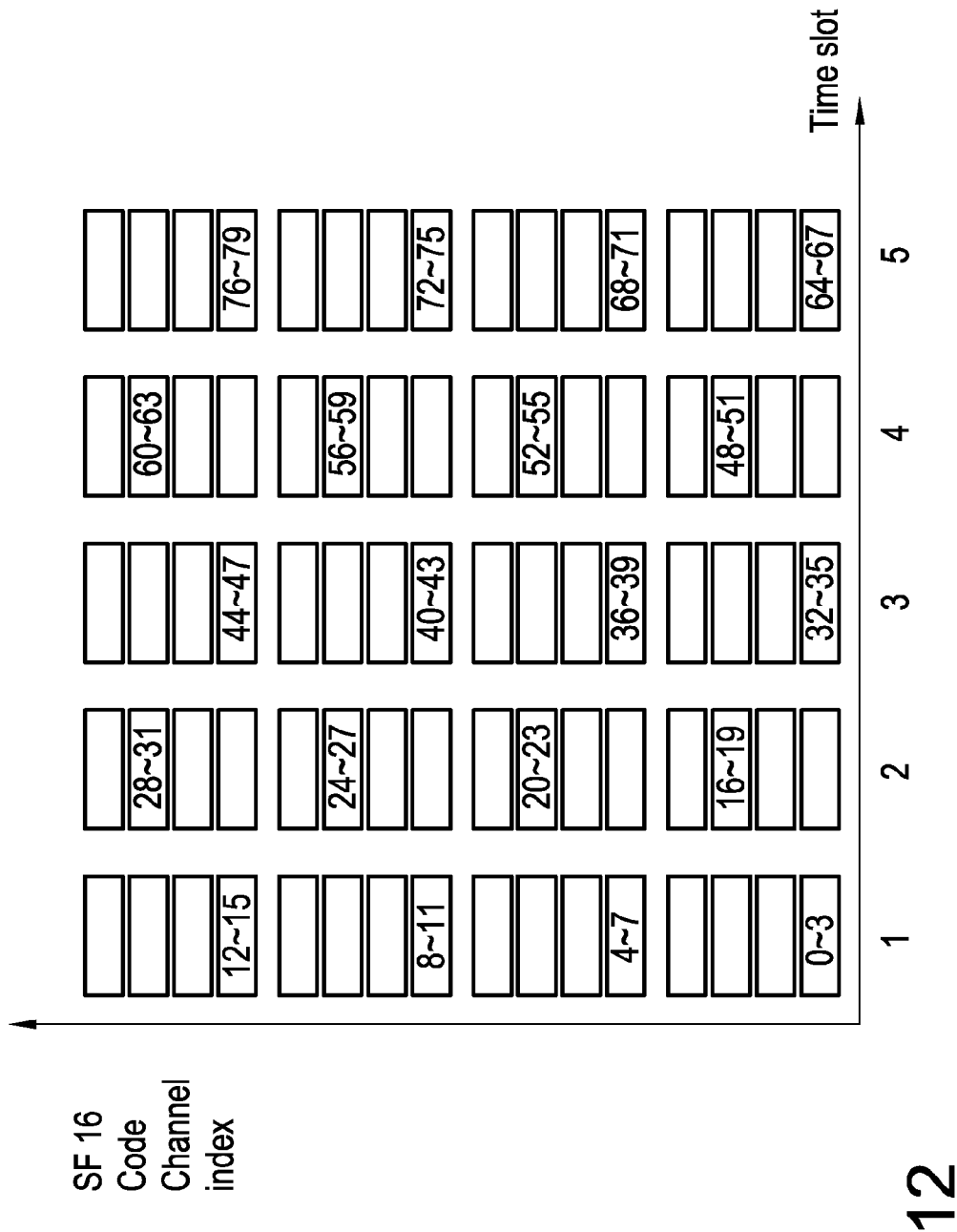
FIG. 12 shows a first mapping scheme for nonscheduled, UEs.

Therefore, it is proposed that select 20 RUs from all the 80 RUs, and every selected RU is mapped with 4 signature sequences. For the non-scheduled UE, the NodeB will assign a group of RUs with at least one "sequence" RU, and then the non-scheduled UE will employ the corresponding signature sequences to transmit ACK/NACK and TPC/SS. The selected 20 RUs could be distributed with the 80 RUs with the same distance or according to other format. FIG. 12 is one possible format.

Additionally, when both scheduled and non-scheduled UEs are supported by the system, some RUs should be mapped with one signature sequence and some others should be mapped with four sequences. The concrete mapping format could vary according to practical status, and the only constrain is that the mapping format should be pre-known by NodeB and UE so as to avoide the assignment signals.

Assuming 80 Signature sequences, and the system support the same scheduled and none-scheduled UEs, then 16 (80/5) "one-to-multiple" and "multiple-to-multiple" RUs will be mapped by Signature sequences.

Figure 13:
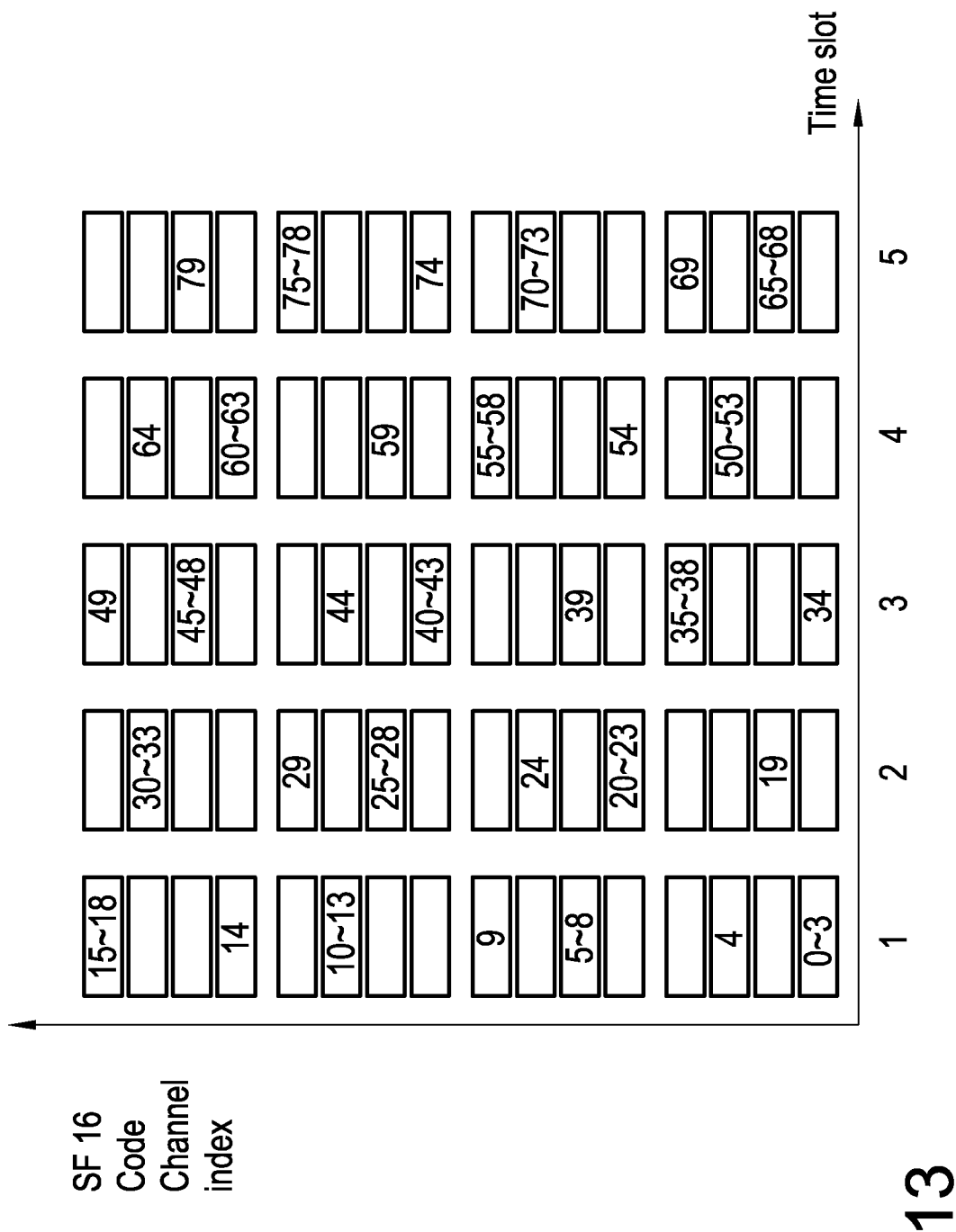
FIG. 13 shows a mapping scheme for both scheduled and non-scheduled Ues.

The corresponding mapping scheme could be described as in FIG. 13 b. Dynamical Mapping Scheme Between Signature Sequence

If less than 5 TSs are assigned as uplink time slots in the existing mapping scheme then a part of the signature sequences is not used. Assume for example that n,n=1,2,3,4 TS are assigned as UL TS, the only 16n Signature sequences could be utilized, and other (5−n)×16 Signature sequences corresponding to DL TSs will never be used.

Therefore, embodiments of the present invention provide another candidate mapping scheme: the (5−n)×16 Signature sequences should be mapped onto the 16n UL RUs, which means more than one Signature sequence could be mapped onto one RU.

The mapping scheme could be various, and the only constraint is the mapping format should be pre-known by BS and UEs so as to avoid the control signal cost for signature sequence allocation.

Figures 14, 15:
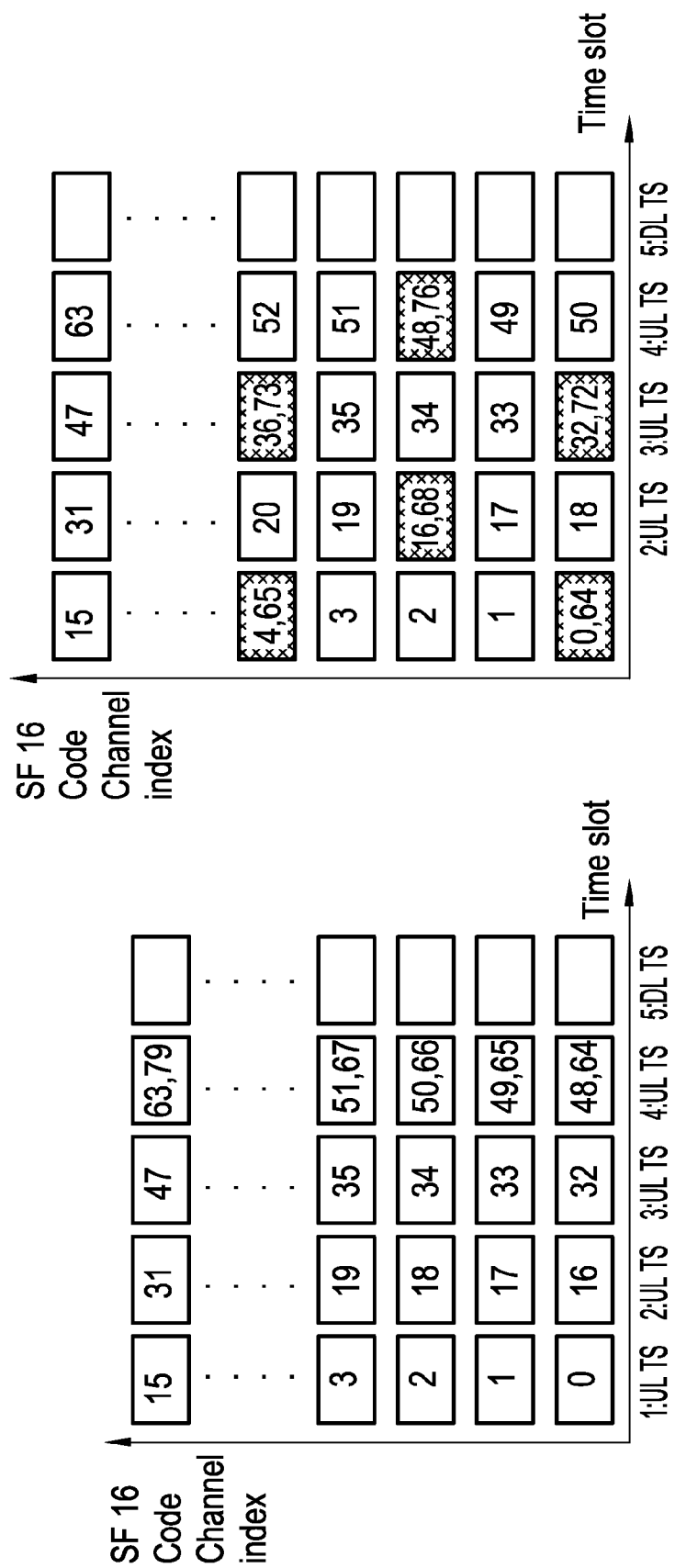
FIG. 14 shows a fifth embodiment according to the invention.
FIG. 15 shows a sixth embodiment according to the invention.

Taking n=4 as an example, FIG. 14 and FIG. 15 show how to map the Signature sequences. In FIG. 14, the Signature sequences 64-79 are mapped to the corresponding RUs in another TS.

Performance Analysis of the Proposed Schemes

For the first problem, the corresponding solutions will be evaluated in this part.

Embodiments of the present invention provide two candidate schemes to reduce the necessary ACK/NACK power: "One-to-multiple" Signature sequence, NodeB allocates Signature sequence to UEs conducting HSUPA transmission, and Code-diversity scheme.

For the first scheme, less Signature sequences (shorter size for every Signature sequence) are employed, so redundancy bits could be added to the Signature sequence to improve the performance. While the performance improvement depend on the coding schemes, therefore Here just provide a rough analysis of the performance improvement of the first two schemes, and the accurate results need consider the concrete coding schemes.

For the second scheme, the simulation result is provided in this ID.

Performance Analysis of the First Scheme

Based on the proposed scheme according to embodiments of the present invention, the signature sequence length could be reduced obviously (equal to the number of Signature sequence).

Assuming with the proposed scheme, the signature sequence length is reduced from 80 to 1, and the saving signature sequence length is utilized to employ a lower modulation so as to improve the correct receiving ratio. Employing the same coding\spreading schemes, the Euclidean distance of two signature sequences will be exceeded to e times (compared to 80 ACK/NACKs): e=101 g(80/n).

Therefore, according to the different length of Signature sequence, the performance improvement of the proposed scheme is shown in Table 1.

TABLE 1

| Achieved Gain of the proposed scheme | | | |
|---|---|---|---|
| ACK/NACK Length | 40 | 20 | 16 |
| Achieved Gain | 3 dB | 6 dB | 7 dB |

Performance Analysis of the Second Scheme

Taking the TD-SCDMA system as an example, simulation result is provided to verify the performance of the proposed second scheme.

Simulation parameters are listed in Table 2.

TABLE 2

| Simulation parameters | | |
|---|---|---|
| Parameter | Value | Comments |
| Codes per timeslot | 8 | 1 E-HICH + 7 others |
| Ec/Ioc (per non-E-HICH code) | −10 dB | |
| Ec/Ioc (E-HICH) | Variable | |
| ACK/NACK indicators per E-HICH | 4 | |
| Carrier frequency | 2 GHz | |
| Channel type | Pedestrian-B 3 kmph | |
| Receiver | ZF | |
| Channel estimation | Realistic | |
| Midamble scheme | Default midamble, Kcell = 8 | |
| Power control | None | |
| Modulation | QPSK | |

In one E-HICH, the proposed scheme use 8 Signature sequences to represent 4 UEs' ACK/NACK bits (every UE occupies two Signature sequence). The existing scheme use 4 Signature sequences to represent 4 UEs' ACK/NACK bits (every UE occupies one Signature sequence).

Figure 16:
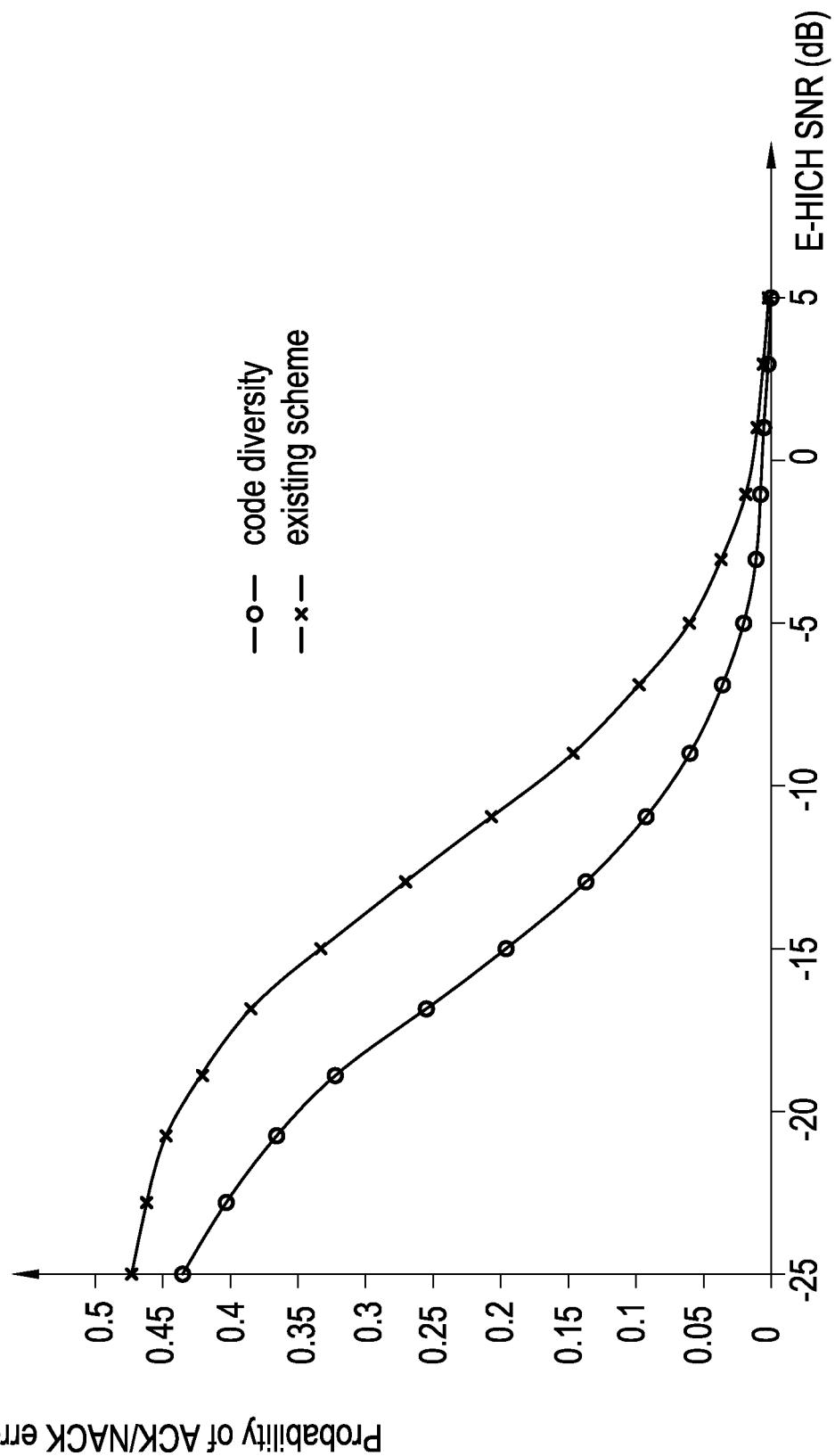
FIG. 16 shows a simulation result of code diversity scheme.
Figure 17:
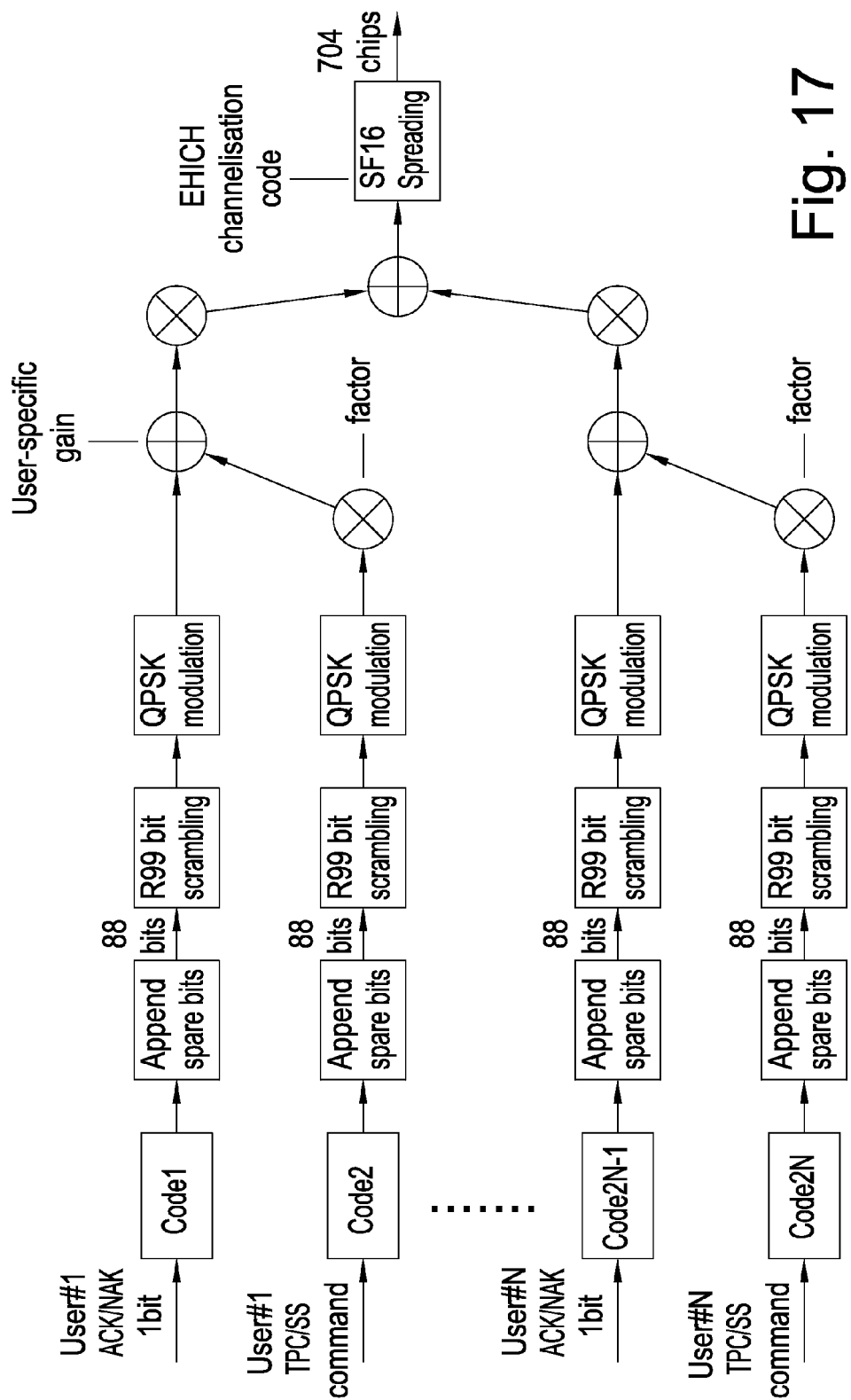
FIG. 17 shows a method of multiplexing E-HICH data.

The simulation result is shown in FIG. 16.

As shown in FIG. 16, about 2~4 dB gain is achieved by utilizing the second scheme.

It should be noted that these two proposed schemes could be employed by other systems, e.g. OFDM, etc. The only modification is the RUs is jointly defined by sub-carrier and time slot.

It is remarked that the scope of protection of the invention is not restricted to the embodiments described herein. Parts of the system may implemented in hardware, software or a combination thereof. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

REFERENCES

[1] 3GPP TS 25.212: "Multiplexing and channel coding (FDD)"
[2] 3GPP TSG RAN WG1 #46 Tdoc R1-062331: LCR TDD: Structure and Coding for E-AGCH and E-HICH
[3] 3GPP TR25.826 v 1.0.1 "3.84 Mcps TDD Enhanced Uplink; Physical Layer Aspects"

[4] 3GPP TR25.827: 1.28 Mcps TDD Enhanced Uplink
[5] 3GPP TSG RAN WG1 #47bis Tdoc R1-070298: LCR TDD: Structure and Coding for E-HICH.

The invention claimed is:

1. A method for use by a base station for wireless communication between the base station and a plurality of subscriber stations, wherein a communication capacity is partitioned into a plurality of resource units at least by code multiplexing, and data from each subscriber station is spread using a signature sequence, the method comprising:
assigning a different signature sequence to each resource unit in a subset of the plurality of resource units;
distributing two or more resource units from the plurality of resource units to one subscriber station of the plurality of subscriber stations; and
receiving a wireless communication from the subscriber station using at least two of the two or more distributed resource units, the wireless communication spread on the at least two of the two or more distributed resource units using a signature sequence assigned to one of the two or more distributed resource units.

2. The method of claim 1, wherein:
the subset of the resource units includes fewer than all the available resource units; and
the base station distributes at least one resource unit having an associated signature sequence to each subscriber station.

3. The method of claim 1, wherein receiving a wireless communication from the subscriber station comprises receiving a wireless communication spread using a signature sequence having a lowest serial number of the signature sequences assigned to the two or more distributed resource units.

4. The method of claim 1, Wherein:
the subset of the plurality of resource units comprises all resource units of the plurality of resource units; and
receiving a wireless communication from the subscriber station comprises receiving a wireless communication spread using a subset of the signature sequences assigned to the two or more distributed resource units, wherein the subset of the signature sequences includes no more than a specified maximum number of the signature sequences assigned to the two or more distributed resource units.

5. The method of claim 4, wherein:
if the number of resource units distributed to the subscriber station is less than or equal to the specified maximum number, receiving a wireless communication from the subscriber station comprises receiving a wireless communication spread using all the signature sequences assigned to the two or more distributed resource units; and
if the number of resource units distributed to the subscriber stat ion is greater than the specified maximum number, receiving a wireless communication from the subscriber station comprises receiving a wireless communication spread using the specified maximum number of the signature sequences assigned to the two or more distributed resource units.

6. A method for use by a subscriber station for wireless communication between a base station and the subscriber station, wherein communication capacity is partitioned into a plurality of resource units at least by code multiplexing, and data from each subscriber station is spread using a signature sequence, the method comprising:
receiving an assignment of a different signature sequence to each resource in a subset of the plurality of resource units;
receiving a distribution of two or more resource units for the subscriber station; and
sending a wireless communication to the base station using at least two of the two or more distributed resource units, the wireless communication spread on the at least two of the two or more distributed resource units sing a signature sequence assigned to on of the two or more distributed resource units.

7. The method of claim 6, wherein the subscriber station sends the wireless communication spread using a signature sequence having a lowest serial number of the signature sequences assigned to the two or more distributed resource units.

8. The method of claim 6, wherein the subscriber station:
receives an assignment of a signature sequence to each resource unit; and
sends the wireless communication to the base station spread using a subset of the signature sequences assigned to the two or more distributed resource units, wherein the subset of the signature sequences includes no more than a specified maximum number of the signature sequences assigned to the two or more distributed resource units.

9. The method of claim 8, wherein:
if the number of resource units distributed to the subscriber station is less than or equal to the specified maximum number, the subscriber station sends the wireless communication spread using all the signature sequences assigned to the two or more distributed resource units; and
if the number of resource units distributed to the subscriber station is greater than the specified maximum number, the subscriber station sends the wireless communication spread using the specified maximum number of the signature sequences assigned to the two or more distributed resource units.

10. The method of claim 9, wherein, if the number of resource units distributed to the subscriber station is greater than the specified maximum number, the subscriber station sends wireless communication spread using the signature sequences having the lowest serial numbers of the sign sequences assigned to the two or more distributed resource units.

11. A base station configured to communicate wirelessly with a plurality of subscriber stations wherein a communication capacity is partitioned into a plurality of resource units at least by code multiplexing, and data from each subscriber station is spread using a signature sequence, the base station comprising:
a transceiver configured to exchange transmissions with the plurality of subscriber stations; and
a processor configured to;
assign a different signature sequence to each resource unit in a subset of the plurality of resource units;
distribute two or more resource units from the plurality of resource units to one subscriber station of the plurality of subscriber stations; and
control the transceiver to receive a wireless communication from the subscriber station using at least two of the two or more distributed resource units, the wireless communication spread on that at least two of the two or more distributed resource units using a signature sequence assigned to one of the two or more distributed resource units.

12. The base station of claim 11, wherein:
the subset of the resource units includes fewer than all the available resource units; and
the processor is further configured to cause the transceiver to distribute at least one resource unit having an associated signature sequence to each subscriber station.

13. The base station of claim 11, wherein the processor is further configured to cause the transceiver to receive a wireless communication spread using a signature sequence having a lowest serial number of the signature sequences assigned to the two or more distributed resource units.

14. The base station of claim 11, wherein:
the subset of the plurality of resource units comprises all resource units of the plurality of resource units; and
the processor is further configured to cause the transceiver to receive a wireless communication spread using a subset of the signature sequences assigned to the two or more distributed resource units, wherein the subset of the signature sequences includes no more than a specified maximum number of the signature sequences assigned to the two or more distributed resource units.

15. The base station of claim 14, wherein the processor is further configured to cause the transceiver to:
if the number of resource units distributed to the subscriber station is less than or equal to the specified maximum number, receive a wireless communication spread using all the signature sequences assigned to the two or more distributed resource units; and
if the number of resource units distributed to the subscriber station is greater than the specified maximum number, receive a wireless communication spread using the specified maximum number of the signature sequences assigned to the two or more distributed resource units.

16. A subscriber station configured to communicate wirelessly with a base station, wherein a communication capacity is partitioned in resource units at least by code multiplexing, and data from the subscriber station is spread using a signature sequence, the subscriber station comprising:
a transceiver configured to exchange transmissions with the base station; and
a processor configured to cause the transceiver to:
receive an assignment of a different signature sequence to each resource in a subset of the plurality of resource units;
receive a distribution of two or more resource units for the subscriber station; and
send a wireless communication to the base station using at least two of the two or more distributed resource units, the wireless communication spread on the at least two of the two or more resource units using a signature sequence assigned to one of the two or more distributed resource units.

17. The subscriber station of claim 16, wherein the processor is further configured to cause the transceiver to send the wireless communication spread using a signature sequence having a lowest serial number of the signature sequences assigned to the two or more distributed resource units.

18. The subscriber station of claim 16, wherein the processor is further configured to cause the transceiver to:
receive an assignment of a signature sequence to each resource unit; and
send the wireless communication to the base station spread using a subset of the signature sequences assigned to the two or more distributed resource units, wherein the subset of the signature sequences includes no more than a specified maximum number of the signature sequences assigned to the two or more distributed resource units.

19. The subscriber station of claim 18, wherein the processor is further configured to cause the transceiver to:
if the number of resource units distributed to the subscriber station is less than or equal to the specified maximum number, send the wireless communication spread using all the signature sequences assigned to the two or more distributed resource units; and
if the number of resource units distributed to the subscriber station is greater than the specified maximum number, send the wireless communication spread using the specified maximum number of the signature sequences assigned to the two or more distributed resource units.

20. A method for use by a base station for wireless communication to the base station from a plurality of subscriber stations, wherein a communication capacity is partitioned into a plurality of resource units distributed over time slots and code channels and data from each subscriber station is spread using a signature sequence, the method comprising:
assigning a different group of signature sequences to each resource unit in first subset of the resource: units;
distributing two or more resource from the plurality of resource units to one subscriber station of the plurality of subscriber stations; and
receiving a plurality of unscheduled wireless communications from the subscriber station using at least two of the two or more distributed resource units, each wireless communication spread using a signature sequence from the group of signature sequences assigned to a first resource unit of the two or more distributed resource units, were the first resource unit is in the first subset of resource units.

* * * * *